United States Patent
Chiu et al.

(10) Patent No.: US 11,939,268 B2
(45) Date of Patent: Mar. 26, 2024

(54) LOW-K MATERIAL AND METHOD FOR MANUFACTURING THE SAME

(71) Applicant: INDUSTRIAL TECHNOLOGY RESEARCH INSTITUTE, Hsinchu (TW)

(72) Inventors: Kuo-Chuang Chiu, Hsinchu (TW); Tzu-Yu Liu, Zhubei (TW); Tien-Heng Huang, Tainan (TW); Tzu-Chi Chou, Hsinchu (TW); Cheng-Ting Lin, Xinyuan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 453 days.

(21) Appl. No.: 17/133,270

(22) Filed: Dec. 23, 2020

(65) Prior Publication Data
US 2021/0198154 A1    Jul. 1, 2021

Related U.S. Application Data

(60) Provisional application No. 62/955,677, filed on Dec. 31, 2019.

(51) Int. Cl.
C04B 35/64    (2006.01)
C04B 35/14    (2006.01)
C04B 35/628   (2006.01)

(52) U.S. Cl.
CPC .............. *C04B 35/64* (2013.01); *C04B 35/14* (2013.01); *C04B 35/62807* (2013.01);
(Continued)

(58) Field of Classification Search
None
See application file for complete search history.

(56) References Cited

U.S. PATENT DOCUMENTS 3,023,492 A * 3/1962 Bristow ............... C04B 35/632
                                                                428/936
5,206,190 A    4/1993 Jean et al.
(Continued)

FOREIGN PATENT DOCUMENTS

CN    101148323 B    6/2010
CN    102531396 B    3/2014
(Continued)

OTHER PUBLICATIONS

Japanese Office Action for Japanese Application No. 2020-214024, dated Nov. 16, 2021, with English translation.
(Continued)

*Primary Examiner* — John J Figueroa
(74) *Attorney, Agent, or Firm* — Birch, Stewart, Kolasch & Birch, LLP

(57) ABSTRACT

A method of forming low-k material is provided. The method includes providing a plurality of core-shell particles. The core of the core-shell particles has a first ceramic with a low melting point. The shell of the core-shell particles has a second ceramic with a low melting point and a low dielectric constant. The core-shell particles are sintered and molded to form a low-k material. The shell of the core-shell particles is connected to form a network structure of a microcrystal phase.

7 Claims, 2 Drawing Sheets

(52) U.S. Cl.
 CPC .............. *C04B 2235/5204* (2013.01); *C04B 2235/5436* (2013.01); *C04B 2235/5445* (2013.01); *C04B 2235/96* (2013.01)

(56) References Cited

U.S. PATENT DOCUMENTS

| | | | | |
|---|---|---|---|---|
| 2002/0142187 | A1* | 10/2002 | Sugimoto | ............... B32B 18/00 428/688 |
| 2008/0236723 | A1* | 10/2008 | Nonaka | ............... H01G 4/1227 501/137 |
| 2013/0022816 | A1* | 1/2013 | Smith | ..................... C04B 35/50 428/404 |

FOREIGN PATENT DOCUMENTS

| | | |
|---|---|---|
| CN | 104193326 B | 10/2015 |
| CN | 105272184 A | 1/2016 |
| CN | 109250920 A | 1/2019 |
| CN | 106278192 B | 3/2019 |
| CN | 109475927 A | 3/2019 |
| CN | 106477895 B | 6/2019 |
| JP | 2000-26163 A | 1/2000 |
| JP | 2004-256347 A | 9/2004 |
| JP | 2010-6690 A | 1/2010 |
| JP | 2010-132540 A | 6/2010 |
| JP | 2010-531287 A | 9/2010 |
| JP | 2018-54961 A | 4/2018 |
| TW | 201736017 A | 10/2017 |
| WO | WO93/06053 A1 | 4/1993 |

OTHER PUBLICATIONS

Taiwanese Office Action fo Appl. No. 109145693 dated Oct. 29, 2021.

Wang et al., "Study on co-firing behavior of cordierite ceramic with $Bi_2O_3$ addition", Liaoning Province Key Laboratory of New Functional Materials and Chemical Technology, Shenyang University, 2013, vol. 44, pp. 367-370.

* cited by examiner

LOW-K MATERIAL AND METHOD FOR MANUFACTURING THE SAME

CROSS REFERENCE TO RELATED APPLICATIONS

This application claims the benefit of U.S. Provisional Application No. 62/955,677, filed on Dec. 31, 2019.

TECHNICAL FIELD

The technical field relates to a low-k material and method for manufacturing the same.

BACKGROUND

In response to the gradual emergence of 5G mobile broadband communications in ICT/IoT, wearable electronics, and green energy applications, it has driven the flourishing development of the domestic high-frequency industry-related markets, such as millimeter wave substrates, materials/components, and module integration. Moreover, in order to achieve full 5G applications (4G or 5G sub-6 GHz and 5G mmWave), low temperature co-fired ceramic (LTCC) components and packaging powders with low temperature sintering, low dielectric, low loss, and low temperature coefficient of resonant frequency should be developed, so that the LTCC packaging technology with miniaturization, high-integration capability, high reliability, compatibility with millimeter-wave high frequency and low loss requirements, low water absorption, and high heat dissipation characteristics is achieved.

SUMMARY

One embodiment of the disclosure provides a method of forming low-k material, including providing a plurality of core-shell particles. The core of the core-shell particles has a first ceramic with a low melting point. The shell of the core-shell particles has a second ceramic with a low melting point and a low dielectric constant. The method also includes sintering the core-shell particles to mold the core-shell particles for forming a low-k material. The shell of the core-shell particles is connected to form the network structure of a microcrystal phase.

In some embodiments, the first ceramic of the core includes silicon oxide, magnesium oxide, aluminum oxide, calcium oxide, boron oxide, and zinc oxide. The silicon oxide and the magnesium oxide have a weight ratio of 100:0 to 100:85. The silicon oxide and the aluminum oxide have a weight ratio of 100:20 to 100:150. The silicon oxide and the calcium oxide have a weight ratio of 100:2 to 100:20. The silicon oxide and the boron oxide have a weight ratio of 100:2 to 100:70. The silicon oxide and the zinc oxide have a weight ratio of 100:2 to 100:70.

In some embodiments, the first ceramic of the core includes silicon oxide, aluminum oxide, calcium oxide, and boron oxide. The silicon oxide and the aluminum oxide have a weight ratio of 100:15 to 100:25. The silicon oxide and the calcium oxide have a weight ratio of 100:10 to 100:25. The silicon oxide and the boron oxide have a weight ratio of 100:30 to 100:50.

In some embodiments, the second ceramic of the shell includes silicon oxide, magnesium oxide, aluminum oxide, calcium oxide, boron oxide, bismuth oxide, titanium oxide, and copper oxide. The silicon oxide and the magnesium oxide have a weight ratio of 100:15 to 100:40. The silicon oxide and the aluminum oxide have a weight ratio of 100:35 to 100:90. The silicon oxide and the calcium oxide have a weight ratio of 100:0.2 to 100:10. The silicon oxide and the boron oxide have a weight ratio of 100:5 to 100:25. The silicon oxide and the bismuth oxide have a weight ratio of 100:2 to 100:15. The silicon oxide and the titanium oxide have a weight ratio of 100:0.2 to 100:25. The silicon oxide and the copper oxide have a weight ratio of 100:0.2 to 100:15.

In some embodiments, the second ceramic of the shell includes silicon oxide, aluminum oxide, calcium oxide, boron oxide, and lithium oxide. The silicon oxide and the aluminum oxide have a weight ratio of 100:90 to 100:110. The silicon oxide and the calcium oxide have a weight ratio of 100:0.2 to 100:10. The silicon oxide and the boron oxide have a weight ratio of 100:5 to 100:25. The silicon oxide and the lithium oxide have a weight ratio of 100:90 to 100:110.

In some embodiments, the first ceramic of the core and the second ceramic of the shell have a molar ratio of 100:0.1 to 100:10.

In some embodiments, the first ceramic of the core has a melting point of 700° C. to 900° C. . The second ceramic of the shell has a melting point of 760° C. to 910° C. . The melting point of the second ceramic of the shell is higher than the melting point of the first ceramic of the core.

In some embodiments, the step of sintering the core-shell particles is performed at a temperature of 800° C. to 900° C. .

In some embodiments, the dielectric constant of the second ceramic of the shell is less than 6.

In some embodiments, the core-shell particles have a diameter of 0.3 micrometers to 3 micrometers.

In some embodiments, the method further includes adding a plurality of aluminum oxide particles during the step of sintering of the core-shell particles. The low-k material includes the aluminum oxide particles dispersed therein. The core-shell particles and the aluminum oxide particles have a weight ratio of 100:25 to 100:45. The aluminum oxide particles have a diameter of 50 nm to 2 μm.

In some embodiments, the low-k material has a dielectric constant of 3 to 5.

One embodiment of the disclosure provides a low-k material, including a first ceramic with a low melting point dispersed in a second ceramic with a low melting point and a low dielectric constant. The second ceramic are connected to form the network structure of a microcrystal phase.

In some embodiments, the first ceramic includes silicon oxide, magnesium oxide, aluminum oxide, calcium oxide, boron oxide, and zinc oxide. The silicon oxide and the magnesium oxide have a weight ratio of 100:0 to 100:85. The silicon oxide and the aluminum oxide have a weight ratio of 100:20 to 100:150. The silicon oxide and the calcium oxide have a weight ratio of 100:2 to 100:20. The silicon oxide and the boron oxide have a weight ratio of 100:2 to 100:70. The silicon oxide and the zinc oxide have a weight ratio of 100:2 to 100:70.

In some embodiments, the first ceramic includes silicon oxide, aluminum oxide, calcium oxide, and boron oxide. The silicon oxide and the aluminum oxide have a weight ratio of 100:15 to 100:25. The silicon oxide and the calcium oxide have a weight ratio of 100:10 to 100:25. The silicon oxide and the boron oxide have a weight ratio of 100:30 to 100:50.

In some embodiments, the second ceramic includes silicon oxide, magnesium oxide, aluminum oxide, calcium oxide, boron oxide, bismuth oxide, titanium oxide, and copper oxide. The silicon oxide and the magnesium oxide have a weight ratio of 100:15 to 100:40. The silicon oxide and the aluminum oxide have a weight ratio of 100:35 to 100:90. The silicon oxide and the calcium oxide have a weight ratio of 100:0.2 to 100:10. The silicon oxide and the boron oxide have a weight ratio of 100:5 to 100:25. The silicon oxide and the bismuth oxide have a weight ratio of 100:2 to 100:15. The silicon oxide and the titanium oxide have a weight ratio of 100:0.2 to 100:25. The silicon oxide and the copper oxide have a weight ratio of 100:0.2 to 100:15.

In some embodiments, the second ceramic comprises silicon oxide, aluminum oxide, calcium oxide, boron oxide, and lithium oxide. The silicon oxide and the aluminum oxide have a weight ratio of 100:90 to 100:110. The silicon oxide and the calcium oxide have a weight ratio of 100:0.2 to 100:10. The silicon oxide and the boron oxide have a weight ratio of 100:5 to 100:25. The silicon oxide and the lithium oxide have a weight ratio of 100:90 to 100:110.

In some embodiments, the first ceramic and the second ceramic have a molar ratio of 100:0.1 to 100:10.

In some embodiments, the first ceramic has a melting point of 700° C. to 900° C. The second ceramic has a melting point of 760° C. to 910° C. The melting point of the second ceramic is higher than the melting point of the first ceramic.

In some embodiments, the second ceramic has a dielectric constant of less than 6.

In some embodiments, the low-k material further includes a plurality of aluminum oxide particles dispersed in the low-k material, wherein the total weight of the first ceramic and the second ceramic and the weight of the aluminum oxide particles have a ratio of 100:25 to 100:45, and the aluminum oxide particles have a diameter of 50 nm to 2 μm.

In some embodiments, the low-k material has a dielectric constant of 3 to 5.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
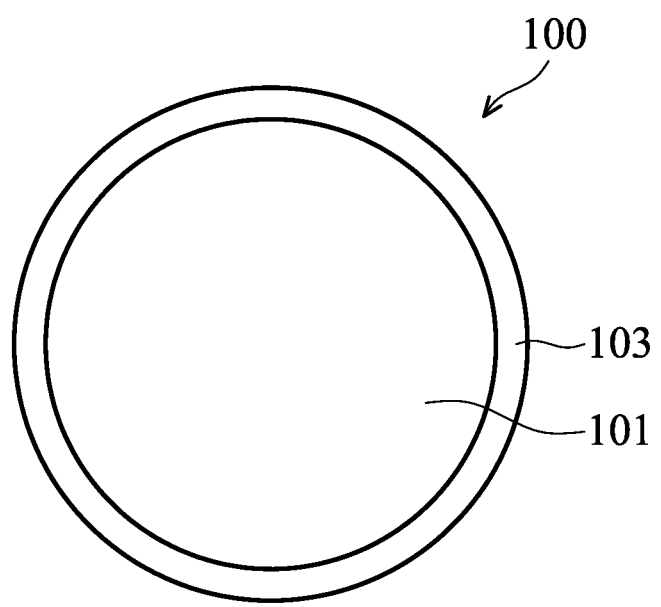
FIG. 1 shows a core-shell particle in some embodiments of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Some embodiments of the disclosure provide a method of forming a low-k material. The method includes providing a plurality of core-shell particles 100, as shown in FIG. 1. The core of the core-shell particles 100 has a first ceramic 101 with a low melting point, and the shell of the core-shell particles 100 has a second ceramic 103 with a low melting point and a low dielectric constant.

In some embodiments, the first ceramic 101 of the core includes silicon oxide, magnesium oxide, aluminum oxide, calcium oxide, boron oxide, and zinc oxide. The silicon oxide and the magnesium oxide have a weight ratio of 100:0 to 100:85, such as 100:1 to 100:80, 100:5 to 100:75, 100:10 to 100:70, or 100:15 to 100:60, but are not limited thereto. If the proportion of magnesium oxide is too low, the melting point will be too high to sinter and mold the product. If the proportion of magnesium oxide is too high, the melting point will be too low to be compatible with the LTCC process because it will be easy to melt. The silicon oxide and the aluminum oxide have a weight ratio of 100:20 to 100:150, such as 100:25 to 100:125, 100:30 to 100:130, 100:40 to 100:140, or 100:20 to 100:120, but are not limited thereto. If the proportion of aluminum oxide is too low, the dielectric loss will be likely to occur. If the proportion of aluminum oxide is too high, the melting point will be too high to sinter and mold the product. The silicon oxide and the calcium oxide have a weight ratio of 100:2 to 100:20, such as 100:3 to 100:18, 100:5 to 100:15, or 100:6 to 100:12, but are not limited thereto. If the proportion of calcium oxide is too low, the melting point will be too high to sinter and mold the product. If the proportion of calcium oxide is too high, the melting point will be too low to be compatible with the LTCC process because it will be easy to melt. The silicon oxide and the boron oxide have a weight ratio of 100:2 to 100:70, such as 100:5 to 100:65, 100:6 to 100:60, or 100:8 to 100:50, but are not limited thereto. If the proportion of boron oxide is too low, the melting point will be too high to sinter and mold the product. If the proportion of boron oxide is too high, the melting point will be too low to be compatible with the LTCC process because it will be easy to melt. The silicon oxide and the zinc oxide have a weight ratio of 100:2 to 100:70, such as 100:5 to 100:65, 100:6 to 100:60, or 100:8 to 100:50, but are not limited thereto. If the proportion of zinc oxide is too low, the melting point will be too high to sinter and mold the product. If the proportion of zinc oxide is too high, the melting point will be too low to be compatible with the LTCC process because it will be easy to melt. Moreover, when the melting point of the first ceramic is too high, the material cannot be sintered and molded to be compatible with the LTCC process, and cannot match the melting point of the second ceramic to form the core-shell particle structure.

In one embodiment, the first ceramic 101 of the core includes silicon oxide, aluminum oxide, calcium oxide, and boron oxide. The silicon oxide and the aluminum oxide have a weight ratio of 100:15 to 100:25, such as 100:15 to 100:20 or 100:20 to 100:25, but are not limited thereto. If the proportion of aluminum oxide is too low, the dielectric loss will be likely to occur. If the proportion of aluminum oxide is too high, the melting point will be too high to sinter and mold the product. The silicon oxide and the calcium oxide have a weight ratio of 100:10 to 100:25, such as 100:10 to 100:15, 100:15 to 100:20, 100:20 to 100:25, or 100:12 to 100:22, but is not limited thereto. If the proportion of calcium oxide is too low, the melting point will be too high to sinter and mold the product. If the proportion of calcium oxide is too high, the melting point will be too low to be compatible with the LTCC process because it will be easy to melt. The silicon oxide and the boron oxide have a weight ratio of 100:30 to 100:50, such as 100:30 to 100:40, 100:40 to 100:50, 100:32 to 100:48, or 100:35 to 100:45, but are not limited thereto. If the proportion of boron oxide is too low, the melting point will be too high to sinter and mold the product. If the proportion of boron oxide is too high, the melting point will be too low to be compatible with the LTCC process because it will be easy to melt. Moreover, when the melting point of the first ceramic is too high, the material cannot be sintered and molded to be compatible with the LTCC process, and cannot match the melting point of the second ceramic to form the core-shell particle structure.

In one embodiment, the second ceramic 103 of the shell includes silicon oxide, magnesium oxide, aluminum oxide, calcium oxide, boron oxide, bismuth oxide, titanium oxide, and copper oxide. The silicon oxide and the magnesium oxide have a weight ratio of 100:15 to 100:40, such as about 100:20 to 100:40, 100:15 to 100:35, 100:18 to 100:38, or 100:20 to 100:35, but are not limited thereto. If the proportion of magnesium oxide is too low or too high, the cordierite crystal phase cannot be formed. The silicon oxide and the aluminum oxide have a weight ratio of 100:35 to 100:90, such as about 100:35 to 100:85, 100:40 to 100:80, 100:35 to 100:75, or 100:30 to 100:70, but are not limited thereto. If the proportion of aluminum oxide is too low or too high, the cordierite crystal phase cannot be formed. The silicon oxide and the calcium oxide have a weight ratio of 100:0.2 to 100:10, such as about 100:0.5 to 100:10, 100:1 to 100:10, 100:2 to 100:10, or 100:0.5 to 100:5, but are not limited thereto. If the proportion of calcium oxide is too low, the sintering temperature will be too high due to poor fluxing effect. If the proportion of calcium oxide is too high, the cordierite crystal phase cannot be formed. The silicon oxide and the boron oxide have a weight ratio of 100:5 to 100:25, such as about 100:5 to 100:20, 100:10 to 100:25, or 100:15 to 100:25, but are not limited thereto. If the proportion of boron oxide is too low or too high, the cordierite crystal phase cannot be formed. The silicon oxide and the bismuth oxide have a weight ratio of 100:2 to 100:15, such as about 100:2 to 100:12, 100:5 to 100:15, or 100:5 to 100:10, but are not limited thereto. If the proportion of bismuth oxide is too low, the sintering temperature will be too high due to poor fluxing effect. If the proportion of bismuth oxide is too high, the cordierite crystal phase cannot be formed. The silicon oxide and the titanium oxide have a weight ratio of 100:0.2 to 100:25, such as 100:0.5 to 100:20, 100:1 to 100:15, or 100:5 to 100:25, but are not limited thereto. If the proportion of titanium oxide ratio is too low, the phase will be difficult to form due to poor crystallinity. If the proportion of titanium oxide is too high, the cordierite crystal phase cannot be formed. The silicon oxide and the copper oxide have a weight ratio of 100:0.2 to 100:15, such as about 100:0.5 to 100:15, 100:1 to 100:10, or 100:2 to 100:12, but are not limited thereto. If the proportion of copper oxide is too low, the sintering temperature will be too high due to poor fluxing effect. If the proportion of copper oxide is too high, the cordierite crystal phase cannot be formed.

In one embodiment, the second ceramic 103 of the shell includes silicon oxide, aluminum oxide, calcium oxide, boron oxide, and lithium oxide. The silicon oxide and the aluminum oxide have a weight ratio of 100:90 to 100:110, such as about 100:90 to 100:100, 100:100 to 100:110, or 100:95 to 100:105, but are not limited thereto. If the proportion of aluminum oxide is too low or too high, the eucryptite crystal phase cannot be formed. The silicon oxide and the calcium oxide have a weight ratio of 100:0.2 to 100:10, such as about 100:0.5 to 100:10, 100:1 to 100:10, or 100:0.5 to 100:5, but are not limited thereto. If the proportion of calcium oxide is too low, the sintering temperature will be too high due to poor fluxing effect. If the proportion of calcium oxide is too high, the eucryptite crystal phase cannot be formed. The silicon oxide and the boron oxide have a weight ratio of 100:5 to 100:25, such as about 100:5 to 100:20, 100:10 to 100:25, or 100:10 to 100:20, but are not limited thereto. If the boron oxide ratio is too low or too high, the eucryptite crystal phase cannot be formed. The silicon oxide and the lithium oxide have a weight ratio of 100:90 to 100:110, such as about 100:90 to 100:100, 100:100 to 100:110, or 100:95 to 100:105, but is not limited thereto. If the proportion of lithium oxide is too low or too high, the eucryptite crystal phase cannot be formed.

In one embodiment, the first ceramic 101 of the core and the second ceramic 103 of the shell have a molar ratio of 100:0.1 to 100:10, such as about 100:0.2 to 100:8, 100:0.5 to 100:10, 100:1 to 100:5, or 100:0.5 to 100:5, but is not limited thereto. If the proportion of the second ceramic 103 is too low or the thickness of the shell is too thin, the dielectric constant and the dielectric loss of the product will be too high. If the proportion of the second ceramic 103 is too high or the thickness of the shell is too thick, the dielectric constant and the dielectric loss of the product will not be improved, and the amount of the second ceramic that was added will be wasted.

In one embodiment, the first ceramic 101 of the core has a melting point of 700° C. to 900° C., such as about 720° C. to 820° C., 750° C. to 900° C., or 720° C. to 850° C., but is mot limited thereto. The second ceramic 103 of the shell has a melting point of 760° C. to 910° C., such as about 760° C. to 860° C., 800° C. to 900° C., or 780° C. to 850° C., but is not limited thereto. If the melting points of the two ceramic are too low or too high, the subsequently processing temperature cannot be compatible with the LTCC process. In addition, the melting point of the second ceramic 103 is higher than the melting point of the first ceramic 101. If the melting point of the first ceramic 101 is higher than the melting point of the second ceramic 103, the porosity of the product will be increased to increase the dielectric loss.

In one embodiment, the second ceramic 103 of the shell has a dielectric constant of less than 6, such as about 1, 2, 3, 4, or 5, but is not limited thereto. If the dielectric constant of the second ceramic 103 is too high, the low-k material cannot be formed. In one embodiment, the core-shell particles 100 have a diameter of 0.3 micrometers to 3 micrometers, such as about 0.3 micrometers to 2.5 micrometers, 0.5 micrometers to 3 micrometers, 0.5 micrometers to 2 micrometers, or 1 micrometer to 2.5 micrometers, but are not limited thereto. If the core-shell particles 100 are too small or too large, the product will be difficult to be used in tape casting to compatible with LTCC process.

In one embodiment of the disclosure, the core-shell particles 100 are formed by sol-gel method. For example, particles of the first ceramic 101 for the core can be mixed with a solution of several oxide sources for the second ceramic 103 (e.g. aluminum nitrate, magnesium nitrate, tetraethoxysilane, tetrabutyl titanate, boric acid, bismuth nitrate, copper nitrate, calcium nitrate, or a combination thereof) to form a sol. The sol is then heated to form a gel. The gel is then dried and ground to form powder. The powder can be further processed at high temperature to form the core-shell particles. It should be noted that one skilled in the art may select any suitable process to form the core-shell particles 100, and is not limited to the above-mentioned sol-gel method.

Figure 2:
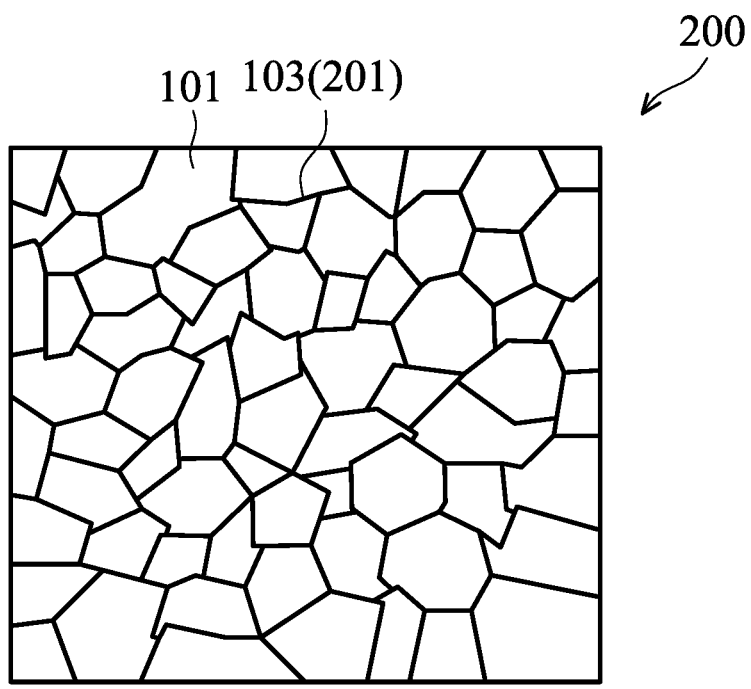
FIG. 2 shows a low-k material in some embodiments of the disclosure.

Subsequently, the core-shell particles are sintered to be molded to form a low-k material 200, as shown in FIG. 2. The second ceramic 103 in the shell of the core-shell particles 100 will be connected to form the network structure 201 of a microcrystal phase, and the first ceramic 101 is dispersed in the connected second ceramic 103. In one embodiment, the core-shell particles 100 are sintered at a temperature of 800° C. to 900° C., such as about 820° C., 830° C., 850° C., 870° C., or 880° C., but is not limited thereto. If the sintering temperature is too low, the product will have many defects, and the dielectric constant and dielectric loss will be high. If the sintering temperature is too high, the product will melt and cannot be molded.

Figure 3:
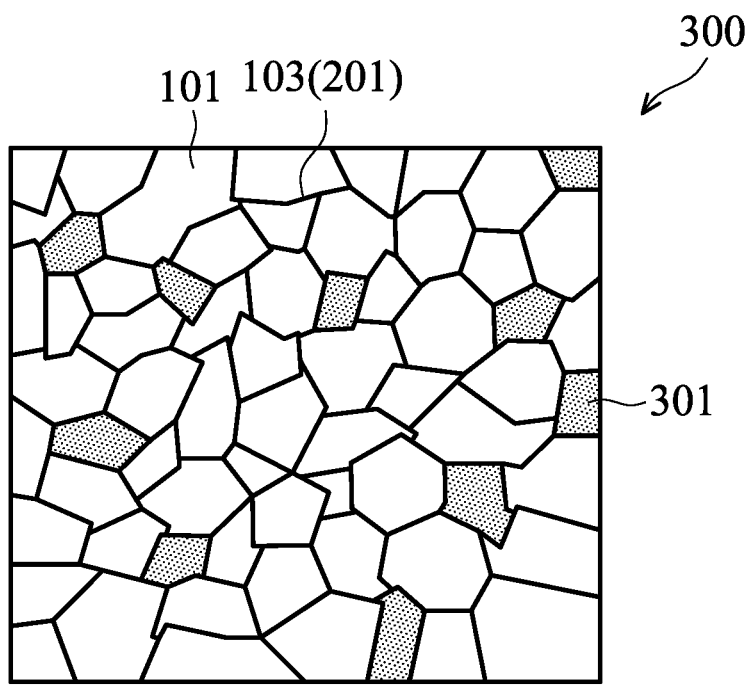
FIG. 3 shows a low-k material in some embodiments of the disclosure.

In one embodiment, a plurality of aluminum oxide particles 301 are further added during the sintering of the core-shell particles 100, such that the low-k material 300 includes the aluminum oxide particles 301 dispersed therein, as shown in FIG. 3. In some embodiments, the core-shell particles 100 and the aluminum oxide particles 301 have a weight ratio of 100:25 to 100:45, such as about 100:25 to 100:40, 100:30 to 100:45, or 100:30 to 100:40, but are not limited thereto. Addition of the aluminum oxide particles 301 may further reduce the cost of the low-k material 300. If the proportion of the aluminum oxide particles 301 is too high, the dielectric constant of the product will be increased. In one embodiment, the aluminum oxide particles 301 have a diameter of 50 nm to 2 µm, such as about 100 nm to 2 µm, 200 nm to 2 µm, 500 nm to 1.8 µtm, 500 nm to 1.5 µm, or 800 nm to 1.5 µm, but are not limited thereto. If the diameter of the aluminum oxide particles 301 is too small, the strength of the sintered material will be insufficient. If the diameter of the aluminum oxide particles 301 is too large, the network structure will be broken to increase the dielectric constant of the product.

In one embodiment, the low-k material obtained from the above-mentioned process may have (but be not limited to) a dielectric constant of 3 to 6, such as 3.5, 4, 4.5, 5, 6, and the like.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

$Al(NO_3)_3 \cdot 9H_2O$ (FW=375.14, 20.54 g, 54.8 mmol), $Mg(NO_3)_2 \cdot 6H_2O$ (FW=256.41, 6.14 g, 23.9 mmol), $Si(C_2H_5O)_4$ (FW=208.33, 14.35 mL, 64.3 mmol), and $Ti(C_4H_9O)_4$ (FW=340.32, 0.077 mL, 0.217 mmol) were dissolved in anhydrous ethanol. Filler glass A (containing about 50 parts by weight of MgO, about 38.6 parts by weight $Al_2O_3$, and about 100 parts by weight of $SiO_2$, its average molecular weight was about 57.4) was then added to the ethanol solution and stirred to be uniform, thereby obtaining Liquid A. Modifiers $H_3BO_3$ (FW=61.83, 0.9328 g, 15 mmol), $Bi(NO_3)_3 5H_2O$ (FW=485.07, 0.7299 g, 1.5 mmol), $Cu(NO_3)_2 \cdot 2.5H_2O$ (FW=232.59, 1.3308 g, 5.7 mmol), and $Ca(NO_3)_2 \cdot 4H_2O$ (FW=236.15, 0.2211 g, 0.94 mmol) were added to a mixture liquid of anhydrous ethanol and de-ionized water, and stirred to be uniform. Ammonia was added to the above-mentioned mixture to adjust its pH value to be 9.23, thereby obtaining Liquid B. Liquid A and Liquid B were mixed and stirred to be uniform for obtaining a sol.

The sol was put into an oven and stood at 40° C. to perform a sol-gel reaction to obtain a gel. The gel was put in an environment at 80° C. to be dried, and then ground to form powder. The powder was stood at 250° C. for 3 hours, then heated to 750° C. and maintained at 750° C. for 2 hours, and cooled and ground to form LTCC core-shell particles, in which core (glass A) and shell (containing silicon oxide, magnesium oxide, aluminum oxide, calcium oxide, boron oxide, bismuth oxide, titanium oxide, and copper oxide) have a molar ratio of 94:6.

An appropriate amount of the core-shell particles was pressed by a pressure of 40 kg/m² to manufacture a round embryo with a diameter of 11 mm, which was maintained at 850° C. for 2 hours, thereby connecting the shell of the core-shell particles to form the network structure of a microcrystal phase. The above-mentioned product had a density of 2.71 g/cm³, a dielectric constant Dk of 4.72 (1 GHz), and a dielectric loss Df of $3.4 \times 10^{-4}$ (1 GHz). The density was measured according to the standard CNS3299-3, and the dielectric constant and the dielectric loss were measured according to the standard IPC-TM-650.

Example 2

$Al(NO_3)_3 \cdot 9H_2O$ (FW=375.14, 35.75 g, 95.3 mmol), $Mg(NO_3)_2 \cdot 6H_2O$ (FW=256.41, 10.69 g, 41.7 mmol), $Si(C_2H_5O)_4$ (FW=208.33, 23.24 mL, 104.2 mmol), and $Ti(C_4H_9O)_4$ (FW=340.32, 0.1353 mL, 0.398 mmol) were dissolved in anhydrous ethanol. Filler glass A (containing about 50 parts by weight of MgO, about 38.6 parts by weight $Al_2O_3$, and about 100 parts by weight of $SiO_2$, its average molecular weight was about 57.4) was then added to the ethanol solution and stirred to be uniform, thereby obtaining Liquid A. Modifiers $H_3BO_3$ (FW=61.83, 1.6237 g, 26.2 mmol), $Bi(NO_3)_3 \cdot 5H_2O$ (FW=485.07, 1.2705 g, 2.62 mmol), $Cu(NO_3)_2 \cdot 2.5H_2O$ (FW=232.59, 2.3166g, 9.96 mmol), and $Ca(NO_3)_2 \cdot 4H_2O$ (FW=236.15, 0.385 g, 1.63 mmol) were added to a mixture liquid of anhydrous ethanol and de-ionized water, and stirred to be uniform. Ammonia was added to the above-mentioned mixture to adjust its pH value to be 9.23, thereby obtaining Liquid B. Liquid A and Liquid B were mixed and stirred to be uniform for obtaining a sol.

The sol was put into an oven and stood at 40° C. to perform a sol-gel reaction to obtain a gel. The gel was put in an environment at 80° C. to be dried, and then ground to form powder. The powder was stood at 250° C. for 3 hours, then heated to 750° C. and maintained at 750° C. for 2 hours, and cooled and ground to form LTCC core-shell particles, in which core (glass A) and shell (containing silicon oxide, magnesium oxide, aluminum oxide, calcium oxide, boron oxide, bismuth oxide, titanium oxide, and copper oxide) have a molar ratio of 90:10.

An appropriate amount of the core-shell particles was pressed by a pressure of 40 kg/m² to manufacture a round embryo with a diameter of 11 mm, which was maintained at 850° C. for 2 hours, thereby connecting the shell of the core-shell particles to form the network structure of a microcrystal phase. The above-mentioned product had a density of 2.72 g/cm³, a dielectric constant Dk of 5.13 (1 GHz), and a dielectric loss Df of $5.4 \times 10^{-4}$ (1 GHz). The density was measured according to the standard CNS3299-3, and the dielectric constant and the dielectric loss were measured according to the standard IPC-TM-650.

Example 3

$Al(NO_3)_3 \cdot 9H_2O$ (FW=375.14, 5.19 g, 13.9 mmol), $Mg(NO_3)_2 \cdot 6H_2O$ (FW=256.41, 1.55 g, 6.1 mmol), $Si(C_2H_5O)_4$ (FW=208.33, 3.37 mL, 15.1 mmol), and $Ti(C_4H_9O)_4$ (FW=340.32, 0.019 mL, 0.0536 mmol) were dissolved in anhydrous ethanol. Filler glass B (containing about 47.2 parts by weight of $B_2O_3$, about 105.5 parts by weight $Al_2O_3$, and about 100 parts by weight of $SiO_2$, its average molecular weight was about 72.5) was then added to the ethanol solution and stirred to be uniform, thereby obtaining Liquid A. Modifiers $H_3BO_3$ (FW=61.83, 0.118 g, 1.9 mmol), $Bi(NO_3)_3 \cdot 5H_2O$ (FW=485.07, 0.066 g, 0.14 mmol), $Cu(NO_3)_2 \cdot 2.5H_2O$ (FW=232.59, 0.336 g, 1.4 mmol), and $Ca(NO_3)_2 \cdot 4H_2O$ (FW=236.15, 0.056 g, 0.2 mmol) were added to a mixture liquid of anhydrous ethanol and de-ionized water, and stirred to be uniform. Ammonia was added to the above-mentioned mixture to adjust its pH value to be 9.23, thereby obtaining Liquid B. Liquid A and Liquid B were mixed and stirred to be uniform for obtaining a sol.

The sol was put into an oven and stood at 40° C. to perform a sol-gel reaction to obtain a gel. The gel was put in an environment at 80° C. to be dried, and then ground to form powder. The powder was stood at 250° C. for 3 hours, then heated to 750° C. and maintained at 750° C. for 2 hours, and cooled and ground to form LTCC core-shell particles, in which core (glass B) and shell (containing silicon oxide, magnesium oxide, aluminum oxide, calcium oxide, boron oxide, bismuth oxide, titanium oxide, and copper oxide) have a molar ratio of 98:2. An appropriate amount of the core-shell particles was pressed by a pressure of 40 kg/m² to manufacture a round embryo with a diameter of 11 mm, which was maintained at 850° C. for 2 hours, thereby connecting the shell of the core-shell particles to form the network structure of a microcrystal phase. The above-mentioned product had a density of 2.66 g/cm³, a dielectric constant Dk of 3.21 (11 GHz), a dielectric loss Df of $2.21 \times 10^{-3}$ (11 GHz), and a temperature coefficient of resonant frequency (τf) of −0.20 (20° C. to 100° C., DC=1V). The density was measured according to the standard CNS3299-3, the dielectric constant and the dielectric loss were measured according to the standard IPC-TM-650, and the temperature coefficient of resonant frequency was measured according to the literature Journal of the Ceramic Society of Japan 122 [6], page 492-495, 2014.

Example 4

$Al(NO_3)_3 \cdot 9H_2O$ (FW=375.14, 5.83 g, 15.5 mmol), $Mg(NO_3)_2 \cdot 6H_2O$ (FW=256.41, 1.74 g, 6.7 mmol), $Si(C_2H_5O)_4$ (FW=208.33, 3.39 mL, 15.2 mmol), and $Ti(C_4H_9O)_4$ (FW=340.32, 0.022 mL, 0.0062 mmol) were dissolved in anhydrous ethanol. Filler glass C (containing about 37.21 parts by weight of $B_2O_3$, about 21.39 parts by weight $Al_2O_3$, about 19.01 parts by weight of CaO, and about 100 parts by weight of $SiO_2$, its average molecular weight was about 65.7) was then added to the ethanol solution and stirred to be uniform, thereby obtaining Liquid A. Modifiers $H_3BO_3$ (FW=61.83, 0.265 g, 4.28 mmol), $Bi(NO_3)_3 \cdot 5H_2O$ (FW=485.07, 0.2073 g, 0.427 mmol), $Cu(NO_3)_2 \cdot 2.5H_2O$ (FW=232.59, 0.378 g, 1.625 mmol), and $Ca(NO_3)_2 4H_2O$ (FW=236.15, 0.063 g, 0.267 mmol) were added to a mixture liquid of anhydrous ethanol and de-ionized water, and stirred to be uniform. Ammonia was added to the above-mentioned mixture to adjust its pH value to be 9.23, thereby obtaining Liquid B. Liquid A and Liquid B were mixed and stirred to be uniform for obtaining a sol.

The sol was put into an oven and stood at 40° C. to perform a sol-gel reaction to obtain a gel. The gel was put in an environment at 80° C. to be dried, and then ground to form powder. The powder was stood at 250° C. for 3 hours, then heated to 750° C. and maintained at 750° C. for 2 hours, and cooled and ground to form LTCC core-shell particles, in which core (glass C) and shell (containing silicon oxide, magnesium oxide, aluminum oxide, calcium oxide, boron oxide, bismuth oxide, titanium oxide, and copper oxide) have a molar ratio of 98:2.

An appropriate amount of the core-shell particles was pressed by a pressure of 40 kg/m² to manufacture a round embryo with a diameter of 11 mm, which was maintained at 850° C. for 2 hours, thereby connecting the shell of the core-shell particles to form the network structure of a microcrystal phase. The above-mentioned product had a density of 2.37 g/cm³, a dielectric constant Dk of 4.7 (1 GHz), and a dielectric loss Df of $1.5 \times 10^{-3}$ (1 GHz). The density was measured according to the standard CNS3299-3, and the dielectric constant and the dielectric loss were measured according to the standard IPC-TM-650.

Comparative Example 1

Glass A in Example 1 was pressed by a pressure of 40 kg/m² to manufacture a round embryo with a diameter of 11 mm, which was maintained at 850° C. for 2 hours. The above-mentioned product had a density of 3.13 g/cm³, a dielectric constant Dk of 5.79 (1 GHz), and a dielectric loss Df of $1.3 \times 10^{-3}$ (1 GHz). The density was measured according to the standard CNS3299-3, and the dielectric constant and the dielectric loss were measured according to the standard IPC-TM-650.

Comparative Example 2

Glass B in Example 3 was pressed by a pressure of 40 kg/m² to manufacture a round embryo with a diameter of 11 mm, which was maintained at 850° C. for 2 hours. The above-mentioned product had a density of 2.63 g/cm³, dielectric constants Dk of 5.29 (1 GHz) and 4.95 (11 GHz), dielectric loss Df of $7 \times 10^{-5}$ (1 GHz) and $2 \times 10^{-3}$ (11 GHz), and a temperature coefficient of resonant frequency (τf) of 2.99 (20° C. to 100° C., DC=1V). The density was measured according to the standard CNS3299-3, the dielectric constant and the dielectric loss were measured according to the standard IPC-TM-650, and the temperature coefficient of resonant frequency was measured according to the literature Journal of the Ceramic Society of Japan 122 [6], page 492-495, 2014.

Comparative Example 3

Glass C in Example 4 was pressed by a pressure of 40 kg/m² to manufacture a round embryo with a diameter of 11 mm, which was maintained at 850° C. for 2 hours. The above-mentioned product had a density of 2.35 g/cm³, a dielectric constant Dk of 4.91 (1 GHz), and a dielectric loss Df of $1.5 \times 10^{-3}$ (1 GHz). The density was measured according to the standard CNS3299-3, and the dielectric constant and the dielectric loss were measured according to the standard IPC-TM-650.

The molar ratios of the core and the shell, the densities, the dielectric constants Dk, the dielectric loss Df, and the temperature coefficients of resonant frequency τf in Examples 1-4 and Comparative Examples 1-3 are listed in Table 1 for comparison.

TABLE 1

| | Molar ratio of core and shell (composition) | Product density (g/cm³) | Dielectric constant (Dk) | Dielectric loss (Df) | Temperature coefficient of resonant frequency (Tf) |
|---|---|---|---|---|---|
| Example 1 | 94:6 (glass A/cordierite) | 2.71 | 4.72 (1 GHz) | $3.4 \times 10^{-4}$ (1 GHz) | — |
| Example 2 | 90:10 (glass A/cordierite) | 2.72 | 5.13 (1 GHz) | $5.4 \times 10^{-4}$ (1 GHz) | — |
| Example 3 | 98:2 (glass B/cordierite) | 2.66 | 3.21 (11 GHz) | $2.21 \times 10^{-3}$ (11 GHz) | −0.20 |
| Example 4 | 98:2 (glass C/cordierite) | 2.37 | 4.7 (1 GHz) | $1.5 \times 10^{-3}$ (1 GHz) | — |
| Comparative Example 1 | glass A | 3.13 | 5.79 (1 GHz) | $1.3 \times 10^{-3}$ (1 GHz) | — |
| Comparative Example 2 | glass B | 2.63 | 5.29 (1 GHz), 4.95 (11 GHz) | $7 \times 10^{-5}$ (1 GHz), $2 \times 10^{-3}$ (11 GHz) | 2.99 |
| Comparative Example 3 | glass C | 2.35 | 4.91 (1 GHz) | $1.5 \times 10^{-3}$ (1 GHz) | — |

According to the comparison between Examples and Comparative Examples of Table 1, the products formed from sintering and molding the core-shell particles have significant lower dielectric constants than those of the products from only the core materials, and the reduction range may achieve at least 10% to 20%. The above conclusion can be known from the comparison of Examples 1 to 4 and Comparative examples 1 to 3. Moreover, in terms of the dielectric loss, most of the products formed from sintering and molding the core-shell particles have lower dielectric loss than (or at least similar dielectric loss to) those of the products from only the core materials. Similarly, the above conclusion can be known from the comparison of Examples 1 to 4 and Comparative examples 1 to 3.

Continue referring to Table 1, in terms of the temperature coefficient of resonant frequency, glass B (Comparative Example 2) has a positive temperature coefficient of resonant frequency ($\tau f$) of 2.99 (20° C. to 100° C.). The cordierite has a negative temperature coefficient of resonant frequency ($\tau f$) of −12.61 (20° C. to 100° C.). Through the core-shell structure design of the disclosure, the cordierite was added to glass B to serve as the shell material (Example 3), such that the temperature coefficient of resonant frequency ($\tau f$) of glass B was adjusted from +2.99 toward zero. Take the molar ratio of the core and the shell being 98:2 (Example 3) as an example, the total temperature coefficient of resonant frequency ($\tau f$) can be adjusted to −0.2 (20° C. to 100° C.). In other words, the total temperature coefficient of resonant frequency can be reduced or even close to 0 by such design, thereby satisfying the low $\tau f$ for LTCC in 5G application.

Accordingly, the low-k materials provided in some embodiments of the disclosure have the characteristics of low Dk, low Df, and low $\tau f$, so as to achieve the applications of low delay, low loss, and low temperature influence, thereby more satisfying the LTCC materials requirements in 5G applications.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A low-k material, comprising:
a first ceramic with a low melting point dispersed in a second ceramic with a low melting point and a low dielectric constant, wherein the second ceramic are connected to form a network structure of a microcrystal phase,
wherein the first ceramic comprises (1) silicon oxide, magnesium oxide, aluminum oxide, calcium oxide, boron oxide, and zinc oxide,
wherein the silicon oxide and the magnesium oxide have a weight ratio of 100:0 to 100:85,
wherein the silicon oxide and the aluminum oxide have a weight ratio of 100:20 to 100:150,
wherein the silicon oxide and the calcium oxide have a weight ratio of 100:2 to 100:20,
wherein the silicon oxide and the boron oxide have a weight ratio of 100:2 to 100:70, and
wherein the silicon oxide and the zinc oxide have a weight ratio of 100:2 to 100:70;
or
wherein the first ceramic comprises (2) silicon oxide, aluminum oxide, calcium oxide, and boron oxide,
wherein the silicon oxide and the aluminum oxide have a weight ratio of 100:15 to 100:25,
wherein the silicon oxide and the calcium oxide have a weight ratio of 100:10 to 100:25, and
wherein the silicon oxide and the boron oxide have a weight ratio of 100:30 to 100:50.

2. The low-k material as claimed in claim 1, wherein the second ceramic comprises silicon oxide, magnesium oxide, aluminum oxide, calcium oxide, boron oxide, bismuth oxide, titanium oxide, and copper oxide,
wherein the silicon oxide and the magnesium oxide have a weight ratio of 100:15 to 100:40,
wherein the silicon oxide and the aluminum oxide have a weight ratio of 100:35 to 100:90,
wherein the silicon oxide and the calcium oxide have a weight ratio of 100:0.2 to 100:10,
wherein the silicon oxide and the boron oxide have a weight ratio of 100:5 to 100:25,
wherein the silicon oxide and the bismuth oxide have a weight ratio of 100:2 to 100:15, wherein the silicon oxide and the titanium oxide have a weight ratio of 100:0.2 to 100:25,
wherein the silicon oxide and the copper oxide have a weight ratio of 100:0.2 to 100:15.

3. The low-k material as claimed in claim 1, wherein the second ceramic comprises silicon oxide, aluminum oxide, calcium oxide, boron oxide, and lithium oxide,
wherein the silicon oxide and the aluminum oxide have a weight ratio of 100:90 to 100:110,
wherein the silicon oxide and the calcium oxide have a weight ratio of 100:0.2 to 100:10,
wherein the silicon oxide and the boron oxide have a weight ratio of 100:5 to 100:25, and
wherein the silicon oxide and the lithium oxide have a weight ratio of 100:90 to 100:110.

4. The low-k material as claimed in claim 1, wherein the first ceramic and the second ceramic have a molar ratio of 100:0.1 to 100:10.

5. The low-k material as claimed in claim 1, wherein the second ceramic has a dielectric constant of less than 6.

6. The low-k material as claimed in claim 1, further comprising a plurality of aluminum oxide particles dispersed in the low-k material, wherein total weight of the first ceramic and the second ceramic and the weight of the aluminum oxide particles have a ratio of 100:25 to 100:45, and the aluminum oxide particles have a diameter of 50 nm to 2 μm.

7. The low-k material as claimed in claim 1, having a dielectric constant of 3 to 5.

\* \* \* \* \*